(12) United States Patent
Mashiko et al.

(10) Patent No.: US 9,034,513 B2
(45) Date of Patent: May 19, 2015

(54) ENERGY STORAGE DEVICE

(71) Applicant: Lithium Energy Japan, Kyoto (JP)

(72) Inventors: Wataru Mashiko, Ritto (JP); Noriyoshi Munenaga, Ritto (JP); Satoru Kawakami, Ritto (JP)

(73) Assignee: Lithium Energy Japan, Kyoto-shi, Kyoto (JP)

( * ) Notice: Subject to any disclaimer, the term of this patent is extended or adjusted under 35 U.S.C. 154(b) by 36 days.

(21) Appl. No.: 13/794,461

(22) Filed: Mar. 11, 2013

(65) Prior Publication Data

US 2014/0255767 A1    Sep. 11, 2014

(51) Int. Cl.
*H01M 2/26* (2006.01)
*H01M 2/30* (2006.01)

(52) U.S. Cl.
CPC ............... *H01M 2/263* (2013.01); *H01M 2/30* (2013.01)

(58) Field of Classification Search
CPC ................................ H01M 2/263; H01M 2/30
USPC .................................................. 429/179, 178
See application file for complete search history.

(56) References Cited

U.S. PATENT DOCUMENTS

| 2010/0233528 | A1* | 9/2010 | Kim et al. ...................... 429/178 |
| 2012/0148910 | A1 | 6/2012 | Kambayashi et al. |
| 2012/0264007 | A1* | 10/2012 | Sasaki et al. .................. 429/182 |

FOREIGN PATENT DOCUMENTS

| JP | 2010-097822 A | 4/2010 |
| JP | 2010-212240 A | 9/2010 |
| JP | 2012-124129 A | 6/2012 |
| JP | 2013-12363 A | 1/2013 |

* cited by examiner

*Primary Examiner* — Karie O'Neill Apicella
(74) *Attorney, Agent, or Firm* — McGinn IP Law Group, PLLC

(57) ABSTRACT

An energy storage device includes an electrode assembly, a container that contains the electrode assembly therein, a metallic cover member that closes the opening of the container and has a first fitting portion, and a current collector having a second fitting portion that is fitted to the first fitting portion in a fitted state. Thus, the compact energy storage device having a large capacity can suppress the positional deviation between the cover member and the current collector.

23 Claims, 6 Drawing Sheets

ENERGY STORAGE DEVICE

BACKGROUND OF THE INVENTION

1. Field of the Invention

The present invention relates to an energy storage device and, more particularly, to an energy storage device, in which a current collector is attached to a cover member for closing a container that contains an electrode assembly therein.

2. Description of the Related Art

A vehicle such as a hybrid car or an electric car using electric power for a drive source or a part of a drive source has received attention in recent years. As a power source for such a vehicle, an energy storage device having a high energy capacity is practically used. Incidentally, the term "energy storage device" is used as the idea encompassing both of a battery (such as a lithium ion battery or a nickel metal hydride battery) and a capacitor (such as an electric double layer capacitor) in the present specification and claims.

In particular, as an energy storage device to be mounted on an automobile requiring a flow of a large current, a nonaqueous electrolyte secondary battery is used. The nonaqueous electrolyte secondary battery includes a casing constituted of a rectangular thin container and a cover member for closing the container, and an electrode assembly occupying almost all of the inside volume of the casing. In such a secondary battery, an electrode terminal is attached at the outside surface of the cover member. The casing houses a current collector for connecting the electrode terminal and the electrode assembly to each other. The current collector is adapted to take electric power from the electrode assembly to the outside of the casing, and further, to supply the electric power to the electrode assembly.

Moreover, the current collector is physically fixed to the cover member via an insulating member, and further, is electrically and physically connected to the end of the electrode assembly. As a consequence, the electrode assembly is designed to be physically fixed to the cover member via the current collector, and further, to be able to supply and give the electric power in the insulating state with respect to the casing.

In fabricating the above-described secondary battery, it is necessary to definitely determine the position of the current collector with respect to the cover member with ease. A secondary battery disclosed in JP-A-2010-212240 determines the position of a current collector via an insulator by fitting a cover member and an insulating member to each other in position, and further, fitting the insulating member and a current collector to each other.

However, a current collector may be physically fixed to a cover member using a rivet. When the current collector and the cover member are fixed to each other by crushing the rivet, a tool head abutting against the rivet is turned on an axis in a press direction while the rivet is crushed. In this case, the current collector and the cover member produce force to turn in a direction reverse to the turn direction of the tool. The insulating member may not be able to resist the force, and therefore, the current collector and the cover member may be deviated from each other. When deviation occurs between the current collector and the cover member, distortion occurs at the electrode assembly held by the current collector. It is possibility that when the electrode assembly is exposed to vibrations for a long period of time, the electrode assembly is adversely influenced by the deviation or the distortion.

SUMMARY OF THE INVENTION

A first object of the present invention is to provide an energy storage device capable of firmly avoiding any positional deviation of a current collector with respect to a cover member with ease during assembling work so as to suppress occurrence of distortion in an electrode assembly.

An electrode assembly occupies the inside volume of a casing as largely as possible.

A second object of the present invention is to provide an energy storage device, in which an electrode assembly can more largely occupy the inside volume of a casing.

In order to achieve the first object, an energy storage device includes: an electrode assembly; a container that contains the electrode assembly therein; a metallic cover member that closes an opening formed at the container and includes a first fitting portion; a current collector that has a second fitting portion to be fitted to the first fitting portion in a fitted state; and an electrode terminal arranged on a side opposite to the current collector with respect to the cover member.

Here, the fitted state signifies that either one of the first fitting portion and the second fitting portion is formed into a projection whereas the other is formed into a bottomed hole or a through hole, into which at least a part of the projection is inserted. Moreover, the first fitting portion and the second fitting portion are not limited to directly fitted portions, but may be portions to be fitted via another member such as an insulating member.

Moreover, the first fitting portion may be provided with a projecting portion projecting toward the electrode assembly; and the second fitting portion may be provided with a recess portion to be fitted to the projecting portion in a fitted state.

In this manner, at least a part of either one of the first fitting portion of the cover member and the second fitting portion of the current collector is fitted to the other in an insertion state. Therefore, even if the current collector is to be deviated when the current collector is secured to the cover member via the tightening member, the first fitting portion and the second fitting portion are firmly fitted to each other, thus suppressing the deviation between the cover member and the current collector.

Additionally, the first fitting portion may be provided with a projecting portion projecting toward the electrode assembly; and the second fitting portion may be provided with a hole portion to be fitted to the projecting portion in a fitted state.

This can achieve not only the first object but also the second object. Specifically, the first fitting portion and the second fitting portion are fitted to each other in a space defined between the electrode assembly and the cover member, and therefore, the outside space of the cover member having the electrode terminal can become compact. Moreover, the second fitting portion is the hole, and therefore, the second fitting portion can receive the projecting portion of the first fitting portion without projecting toward the electrode assembly. As a consequence, the space between the cover member and the electrode assembly can become compact, thus increasing the proportion of the electrode assembly occupying the inside volume of the casing constituted of the container and the cover member.

In addition, the hole serving as the second fitting portion is formed at the current collector, thus contributing to the light weight of the energy storage device.

Moreover, the energy storage device may further include an insulating member that is a plate-like member formed of an insulator and includes, on one side thereof, a third fitting portion to be fitted to the first fitting portion whereas, on the other side thereof, a fourth fitting portion to be fitted to the second fitting portion.

The insulating member may further include an insertion hole that penetrates in a thickness direction, in which the tightening member is inserted.

Consequently, it is unnecessary to subject the cover member or the like to insulating treatment, and therefore, it is possible to easily secure the insulated state between the cover member and the current collector. Moreover, the first and third fitting portions are fitted to each other, thus facilitating the positioning of the insulating member. Additionally, the deviational force of the current collector with respect to the cover member is exerted on the insulating member in the compression direction. Therefore, even a thin insulating member having a low rigidity can satisfactorily resist the force.

The cover member may be provided with a recessed portion that is recessed toward the electrode assembly on a side opposite to the projecting portion with respect to the cover member, and the cover member may further include a connecting terminal partly disposed at the recessed portion in the fitted state.

In this manner, the structure for preventing the turn of the connecting terminal can be disposed at a portion at which the first fitting portion and the second fitting portion are fitted to each other without allowing the cover member to project toward a side on which the electrode terminal is arranged. Thus, the compactness of the energy storage device can be maintained while the connecting terminal can be disposed.

According to the present invention, it is possible to firmly suppress the deviation of the current collector with respect to the cover member with ease during assembling work. Moreover, it is possible to increase the proportion of the electrode assembly occupying the whole size of the energy storage device, so as to provide the compact energy storage device having a large capacity.

BRIEF DESCRIPTION OF THE DRAWINGS

The foregoing and other features of the invention will become apparent to one skilled in the art to which the present invention relates upon consideration of the invention with reference to the accompanying drawings, wherein.

DETAILED DESCRIPTION OF THE INVENTION

Next, a preferred embodiment of the present invention will be described hereinafter with reference to the attached drawings. Here, a preferred embodiment below merely exemplifies an energy storage device according to the present invention. Consequently, the scope of the present invention is defined by the wordings of claims with reference to the following preferred embodiment, and therefore, is not limited to the following preferred embodiment.

Figure 2:
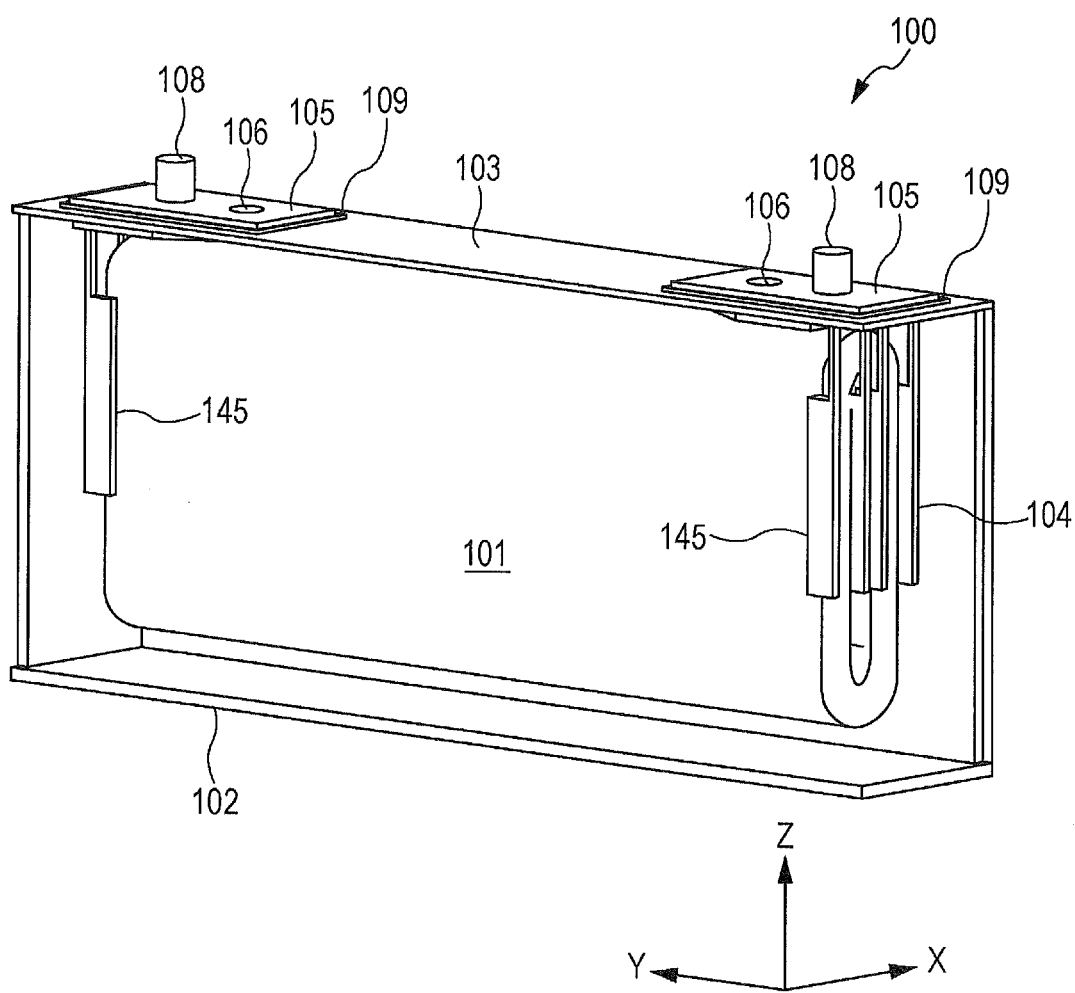
FIG. 2 is a perspective view schematically showing the inside of the energy storage device, although a part of a container is omitted.
Figure 3:
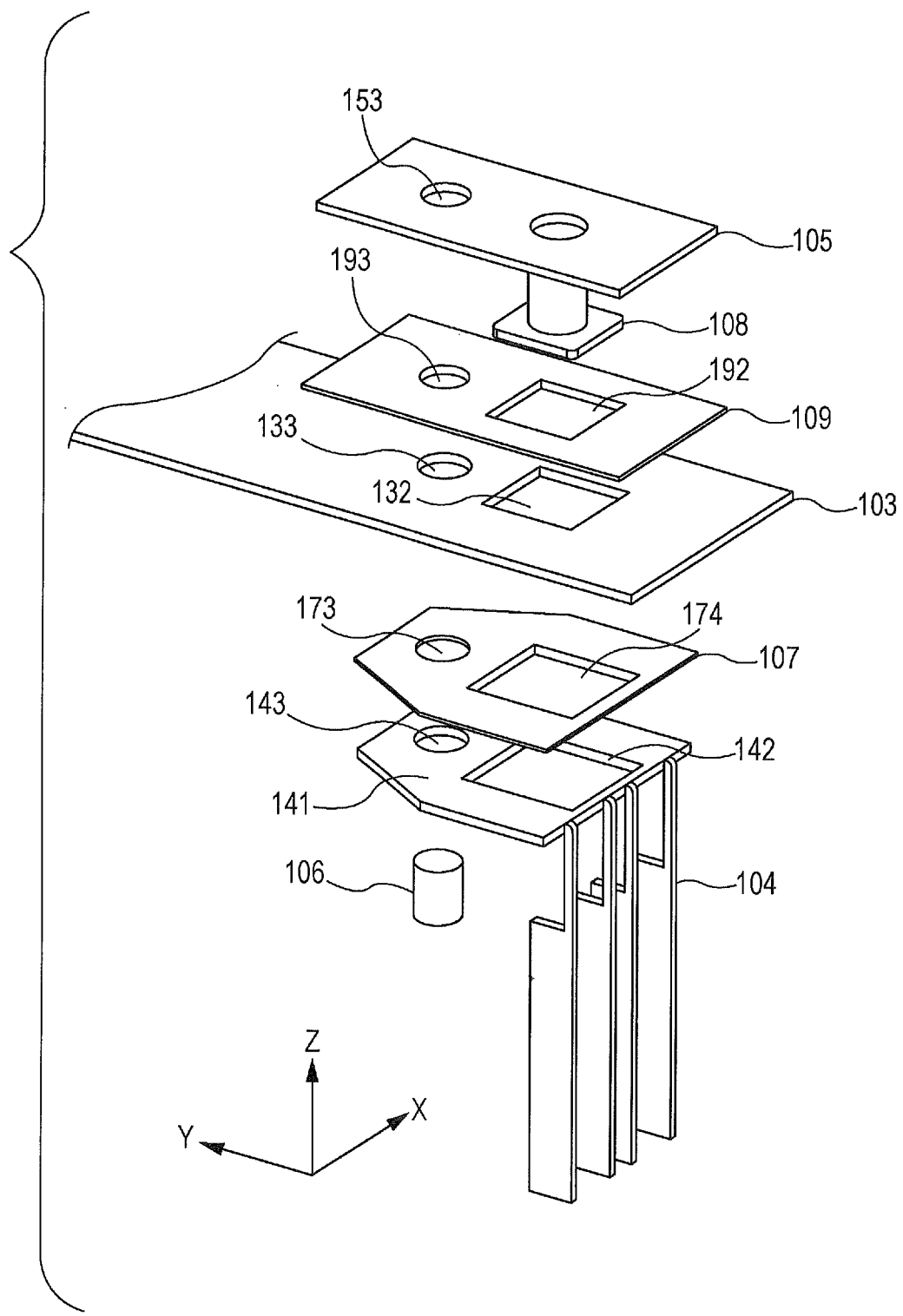
FIG. 3 is an exploded perspective view schematically showing the vicinity of a current collector in an exploded state.

An energy storage device 100 in the present preferred embodiment is a nonaqueous electrolyte secondary energy storage device capable of charging electric power and discharging the electric power. The energy storage device 100 in the present preferred embodiment is provided with an electrode assembly 101, a container 102, a cover member 103, a current collector 104, an electrode terminal 105, and a tightening member 106 (see FIG. 2). Moreover, in the present preferred embodiment, the energy storage device 100 includes a first insulating member 107, a connecting terminal 108, and a second insulating member 109 (see FIG. 3).

In the present preferred embodiment, the electrode assembly 101 is a member that is provided with a separator, a negative electrode, and a positive electrode and can store electric power, although the details are not shown. The negative electrode is obtained by forming a negative active material layer on a belt-like elongated negative electrode current collecting foil made of, for example, copper. The positive electrode is obtained by forming a positive active material layer on a belt-like elongated positive electrode current collecting foil made of, for example, aluminum. The separator is a finely porous sheet made of, for example, a resin. The electrode assembly 101 is a so-called flat wound type electrode assembly, in which a layer having the separator held between the negative electrode and the positive electrode is wound in an oblong shape as a whole in a lengthwise direction.

The container 102 is a rectangular (a rectangular parallelepiped) casing containing the electrode assembly 101 therein. The container 102 is made of aluminum, its alloy, thin stainless steel, or the like for the sake of a light weight. The container 102 is constituted of a rectangular bottom, rectangular long walls erected from long sides of the bottom, and rectangular short walls erected from short sides of the bottom. Moreover, the container 102 constitutes a casing together with the cover member 103 by welding the opening end of the container 102 and the cover member 103 to each other.

Figure 4:
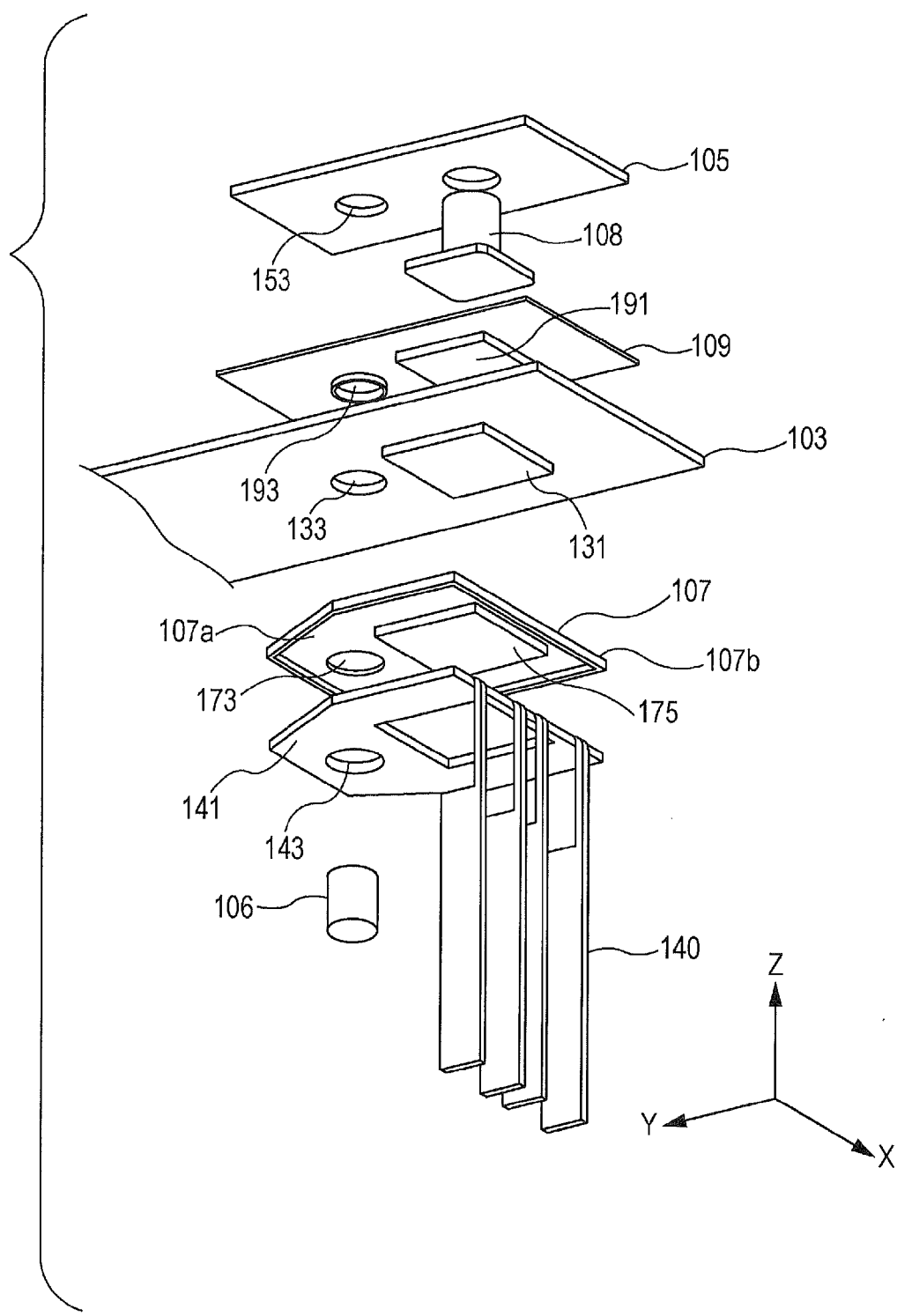
FIG. 4 is an exploded perspective view schematically showing the vicinity of the current collector in the exploded state, as viewed in a direction reverse to FIG. 3.

The cover member 103 is a plate-like metallic member for closing the opening of the container 102, and further, is provided with a first fitting portion 131 (see FIG. 4). In the present preferred embodiment, the first fitting portion 131 is a projection portion that projects toward the electrode assembly 101, and is formed into a rectangular shape (a square shape). Additionally, the first fitting portion 131 is formed by pressing the plate-like metallic member (i.e., the cover member 103). A recessed portion 132 that is recessed toward the electrode assembly 101 is formed at a portion corresponding to and opposite to a projecting portion (i.e., the first fitting portion 131) with respect to the cover member 103. The recessed portion 132 is designed to be formed at the same time when the projecting portion is formed by pressing.

The current collector 104 is electrically connected to the electrode terminal 105 and the electrode assembly 101, and further, also is physically (i.e., mechanically) connected to the cover member 103. The current collector 104 is provided with a second fitting portion 142 to be fitted to the first fitting portion 131 in a fitted state (see FIG. 3). In the present preferred embodiment, the second fitting portion 142 is a hole portion that is fitted to a projecting portion (i.e., the first fitting portion 131) in a fitted state and penetrates a top plate 141 of the current collector 104 in a thickness direction.

In addition, the current collector 104 is the plate-like metallic member disposed in a bent state along the cover member 103 and the short wall of the container 102. Moreover, the current collector 104 is securely connected to the cover member 103 via the tightening member 106 together with the electrode terminal 105, and then, is securely welded to the negative electrode or the positive electrode in the electrode assembly 101, thereby achieving electric connection. In this manner, the electrode assembly 101 is held by the current collector 104 inside the casing.

Here, the current collector 104 to be fixed to the negative electrode of the electrode assembly 101 is made of copper. In contrast, the current collector 104 to be fixed to the positive electrode is made of aluminum.

Figure 1:
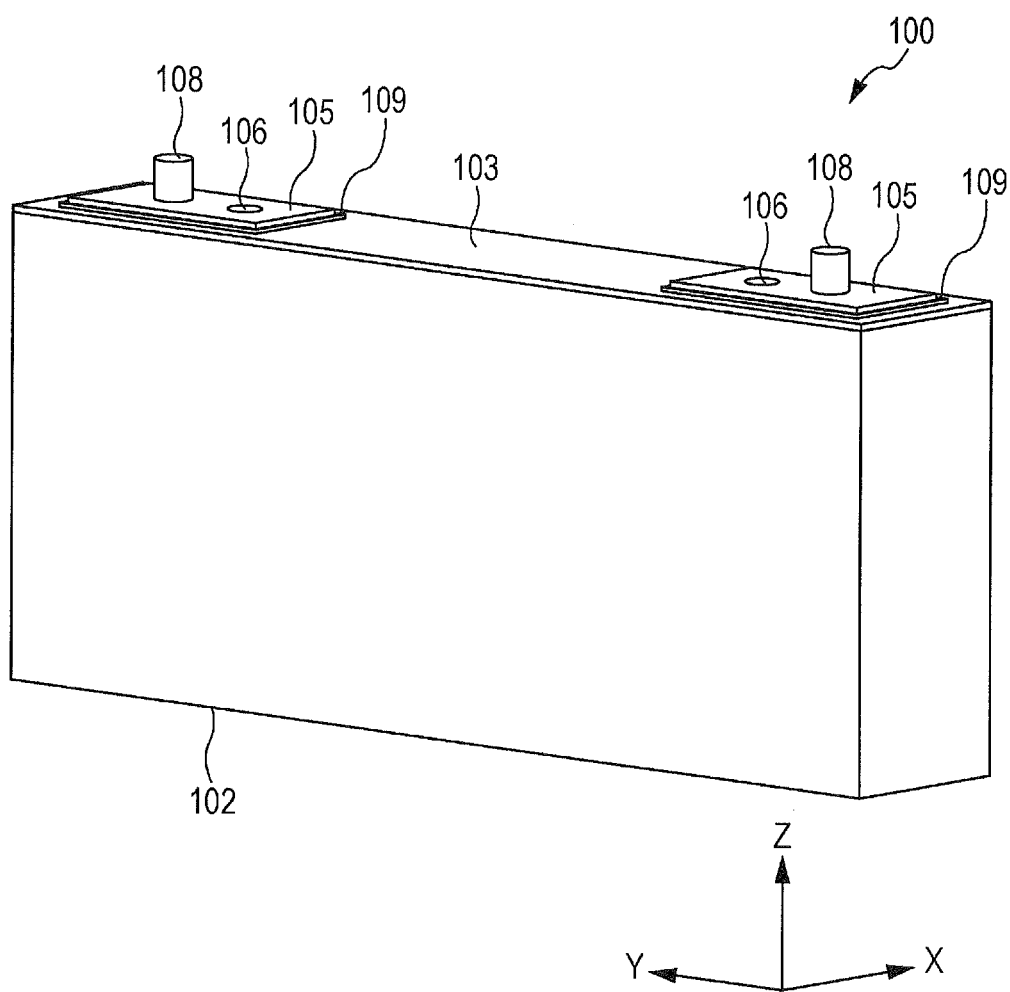
FIG. 1 is a perspective view showing the outside appearance of an energy storage device in a preferred embodiment.

Furthermore, a method for joining the current collector 104 to the negative electrode current collecting foil or the positive electrode current collecting foil in the electrode assembly 101 is not particularly limited. In the present preferred embodiment, a joining method is adopted such that welding fins 145 are erected by bending a part of the current collector 104 (see FIG. 1), and then, the fins 145 hold the negative electrode current collecting foil or the positive electrode current collecting foil in the electrode assembly 101 therebetween while welding them to each other.

Figure 5:
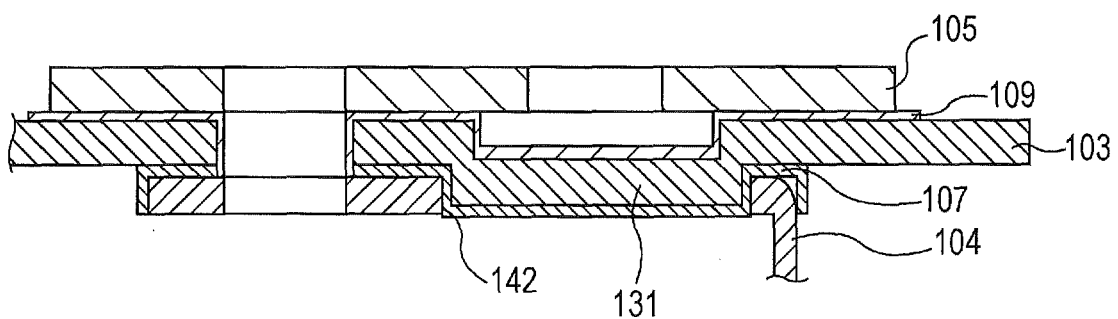
FIG. 5 is a cross-sectional view schematically showing the vicinity of the current collector in cross section.
Figure 5:
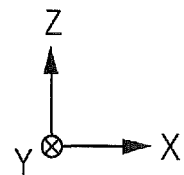

Here, a description will be given of the fitted state between the first fitting portion 131 and the second fitting portion 142 with reference to FIG. 5. FIG. 5 is a cross-sectional view schematically showing the vicinity of the current collector in cross section.

The projecting portion serving as the first fitting portion 131 of the cover member 103 is arranged in such a manner as to be inserted into the hole portion serving as the second fitting portion 142 of the current collector 104 in the Z-axial direction. This state is referred to as the fitted state. In other words, the fitted state signifies a state in which one fitting portion serving as the projecting portion is inserted into the other fitting portion serving as a through hole or a recess portion (i.e., the hole). In the case where the current collector 104 is to be moved in the X and Y directions with respect to the cover member 103, forces reverse to each other within the same X-Y plane are generated in the first fitting portion 131 and the second fitting portion 142. As a consequence, force is applied to the first insulating member 107 interposed between the cover member 103 and the current collector 104 in a compression direction, but no force is applied in a torsion direction. Therefore, even in the case of the thin first insulating member 107, it can satisfactorily resist the force. The tip of the first fitting portion 131 (i.e., the projecting portion), projecting in the direction of the electrode assembly 101 may be located within the thickness of the current collector 104. With this configuration, it is unnecessary to define a large space between the cover member 103 and the electrode assembly 101 in order to avoid the contact of the tip of the first fitting portion 131 with the electrode assembly 101.

The electrode terminal 105 is a terminal for introducing the electric power stored in the electrode assembly 101 to the outside space of the casing constituted of the container 102 and the cover member 103, and further, for introducing the electric power into the inside space of the casing in order to store the electric power in the electrode assembly 101. Moreover, the electrode terminal 105 is a conductive member disposed on a side opposite to the current collector 104 with respect to the cover member 103. In the present preferred embodiment, the cover member 103 is made of metal, and therefore, the electrode terminal 105 is attached to the cover member 103 via the second insulating member 109 for insulating it from the cover member 103 and embedding a clearance with respect to the cover member 103 so as to seal the inside space of the casing.

The tightening member 106 is a conductive member for connecting the current collector 104 and the electrode terminal 105 to each other in a state inserted into the cover member 103. In the present preferred embodiment, the tightening member 106 is a metallic rivet that is plastically strained (i.e., caulked) by a rotationally pressing tool in a state inserted into a first fixing hole 143 formed at the current collector 104, a first insertion hole 173 formed at the first insulating member 107, a second insertion hole 133 formed at the cover member 103, a third insertion hole 193 formed at the second insulating member 109, and a second fixing hole 153 formed at the electrode terminal 105, thus physically (i.e., mechanically) securing the current collector 104 and the electrode terminal 105 to the cover member 103. Additionally, the second insulating member 109 is interposed between the tightening member 106 and the cover member 103. The tightening member 106 electrically connects the current collector 104 and the electrode terminal 105 to each other while keeping the insulating state from the cover member 103.

The first insulating member 107 is a plate-like member formed of an insulator such as a resin, and further, includes a third fitting portion 174 (i.e., a projecting portion receiving recess) to be fitted to the first fitting portion 131 on one side thereof and a fourth fitting portion 175 (i.e., an insulating projecting portion) to be fitted to the second fitting portion 142 on the other side thereof. In the present preferred embodiment, the third fitting portion 174 is formed into a recessed portion to be fitted to the first fitting portion 131 (i.e., the projecting portion). In the meantime, the fourth fitting portion 175 is formed into a projecting portion to be inserted into the second fitting portion 142 (i.e., the hole portion). As shown in FIG. 4, the first insulating member 107 may include a base 107a to be laminated on the top plate 141 of the current collector 104 and a wall 107b formed around the base 107a. The tip of the fourth fitting portion 175 (i.e., the insulating projecting portion) may project toward the electrode assembly 101 beyond the tip of the wall 107b. The fourth fitting portion 175 may project toward the electrode assembly 101 beyond the base 141 in the state in which the base 107a is laminated on the top plate 141.

The connecting terminal 108 is a member for electrically and physically connecting the electrode terminal 105 to another member such as a bus bar or an electric wire. In the present preferred embodiment, the connecting terminal 108 is a bolt having a rectangular head in conformity with the rectangular recessed portion 132 (see FIG. 3).

The second insulating member 109 has a connecting terminal receiving recess 192 recessed toward the electrode assembly 101 at a position corresponding to the recessed portion 132 of the cover member 103. A part of the head of the connecting terminal 108 may be arranged at the recessed portion 132 via the second insulating member 109 in a fitted state. Alternatively, the head of the connecting terminal 108 may fitted only to the connecting terminal receiving recess 192.

As shown in FIG. 4, the second insulating member 109 has a projecting portion 191 projecting toward the electrode assembly 101 on a side opposite to the connecting terminal receiving recess 192. The projection 191 is fitted to the recessed portion 132 of the cover member 103 shown in FIG. 3.

As described above, a part of the connecting terminal 108 is inserted into the recessed portion 132 formed at the cover member 103 as the first fitting portion 131, thereby suppressing the projection amount of the connecting terminal 108 projecting from the surface of the cover member 103, so as to reduce a space required for connecting the energy storage device 100 to the other members. Consequently, it is possible to provide the compact energy storage device 100 that can be installed even in a small space.

The position of the tip of the connecting terminal 108 may be restrained from the viewpoint of a design. That is to say, it may be construed that the height of the container 102 is increased, which causes to increase the height of the connecting terminal 108, in order to enlarge the electrode assembly 101. However, such a design may not be allowed. In the present preferred embodiment, the height of the container 102 is increased by the amount of the head of the connecting terminal 108 to be received in the connecting terminal receiving recess 192 without changing the position of the tip of the connecting terminal 108. Consequently, the larger electrode assembly 101 can be contained in the casing.

With the above-described energy storage device 100, since the first fitting portion 131 of the cover member 103 and the second fitting portion 142 of the current collector 104 are fitted to each other in the fitted state when the electrode terminal 105 and the current collector 104 are connected to each other via the tightening member 106, the current collector 104 can be suppressed from being deviated from the cover member 103 as much as possible. This can prevent the electrode assembly 101 to be connected to the current collector 104 from being distorted or receiving unnecessary force, thus enabling the electrode assembly 101 to be maintained in a correct state.

Moreover, it is unnecessary to provide projecting portions at both surfaces of the first insulating member 107, and therefore, the adoption of the first thin insulating member 107 can decrease the thickness of the space (i.e., the length in the Z-axial direction) where the cover member 103 and the current collector 104 are housed, thus increasing the proportion of the electrode assembly 101 occupying the inside volume of the container 102. In other words, it is possible to provide the compact energy storage device 100 having a large capacity.

Although one electrode (i.e., the positive electrode or the negative electrode) is illustrated in the above-described explanation, the other electrode may be provided with a similar structure. In addition, one electrode may be provided with a structure different from that of the other electrode.

The present invention is not limited to the above-described preferred embodiment. For example, another preferred embodiment implemented by arbitrarily combining the constituent elements described in the present specification with each other or excluding some of the constituent elements may be encompassed in preferred embodiments according to the present invention. Additionally, various modifications conceived by one skilled in the art within a scope without departing from the wordings claimed in claims may be encompassed in preferred embodiments according to the present invention.

For example, the shape of the first fitting portion 131 or the recessed portion 132 is not limited to the rectangle, but may be a circle. Here, if the shape of the first fitting portion 131 or the recessed portion 132 is noncircular (e.g., polygonal or substantially polygonal), it is preferable that the connecting terminal 108 can be restricted from being turned with respect to the cover member 103 on the rotational axis in the Z-axial direction when a part of the connecting terminal 108 is inserted into the recessed portion 132.

In addition, the second fitting portion 142 need not always be the hole portion but may be a recess portion. Here, it is preferable that a through hole formed at the current collector 104 can reduce the weight of the current collector 104.

Although the first fitting portion 131 is formed into the projection, the second fitting portion 142 may be formed into the projection in a direction remote from the electrode assembly 101 whereas the first fitting portion 131 may be formed into a recess. In this case, the shapes of the first insulating member 107 and the second insulating member 109 may be formed into shapes inverse to those in the above-described preferred embodiment.

When the cover member 103 or the current collector 104 is subjected to insulating at a necessary portion thereof, the energy storage device 100 need not be provided with the first insulating member 107 or the second insulating member 109.

Moreover, in the case where another member is welded directly to the electrode terminal 105, the energy storage device 100 need not be provided with the connecting terminal 108.

Figure 6:
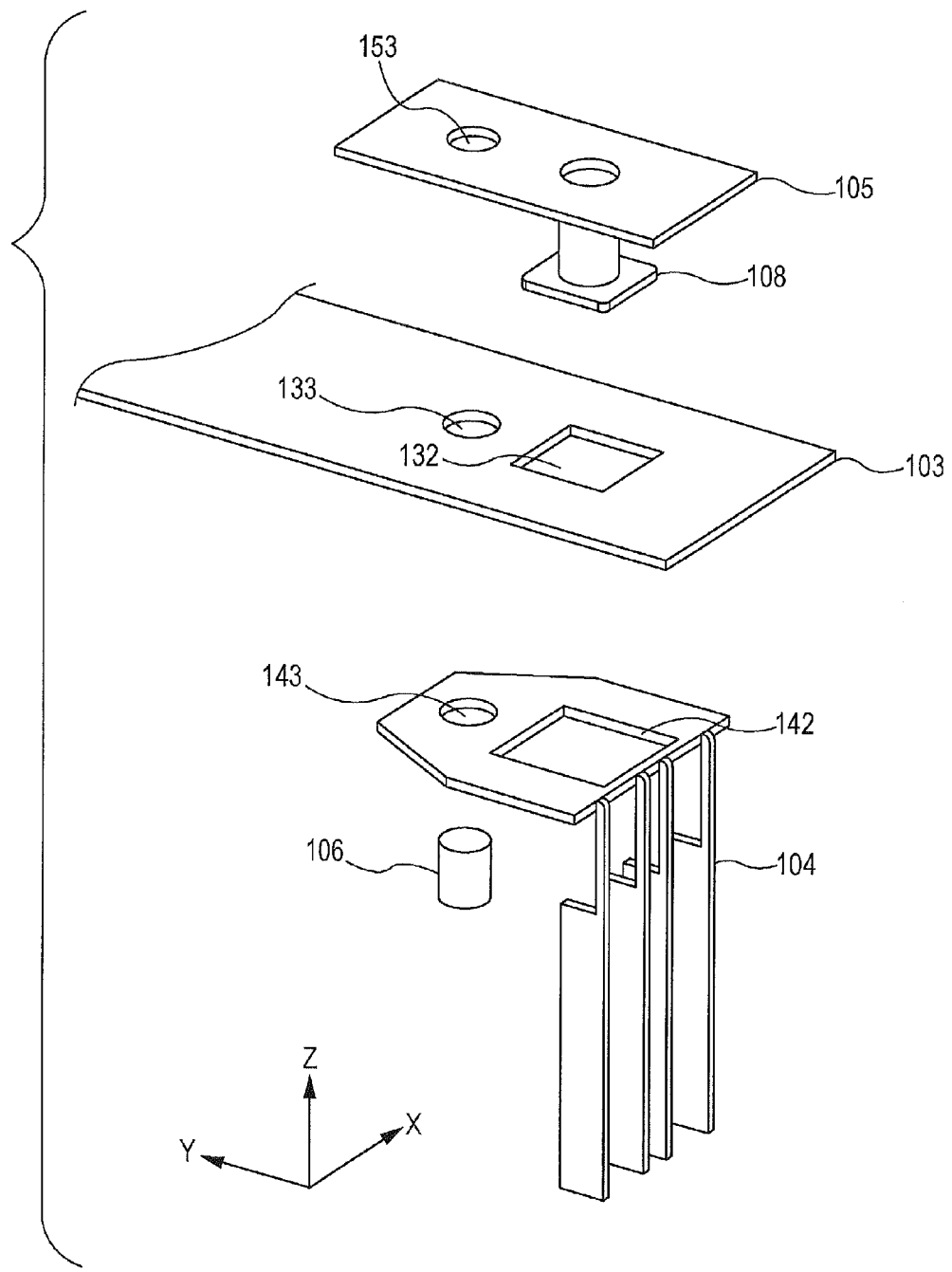
FIG. 6 is an exploded perspective view schematically showing the vicinity of the current collector on a positive electrode side in an exploded state.

Additionally, the current collector 104 of one of the positive and negative electrodes (e.g., the positive electrode) may be brought into contact with the cover member 103 in a conductive state. In this case, there may not be a first insulating member 107 or a second insulating member 109 in the relationship between the current collector 104 of the positive electrode and the cover member 103, as shown in FIG. 6.

The present invention is applicable to the energy storage device. In particular, the present invention is suitably applicable to the energy storage device that requires a large current in a saved space.

What is claimed is:

1. An energy storage device comprising:
    an electrode assembly;
    a container that contains the electrode assembly therein;
    a metallic cover member that closes an opening formed at the container and includes a first fitting portion comprising a projecting portion projecting toward the electrode assembly, the projecting portion projecting from a surface of the metallic cover member and being integrally formed with the metallic cover member;
    a current collector comprising a second fitting portion to be fitted to the projecting portion; and
    an electrode terminal arranged on a side opposite to the current collector with respect to the cover member.

2. The energy storage device according to claim 1, wherein the second fitting portion is provided with a hole portion to be fitted to the projecting portion.

3. The energy storage device according to claim 1, wherein the second fitting portion is provided with a first recessed portion to be fitted to the projecting portion.

4. The energy storage device according to claim 1, further comprising:
    an insulating member that is a plate-like member and interposed between the cover member and the current collector, the insulating member including:
        a third fitting portion to be fitted to the first fitting portion on one side thereof; and
        a fourth fitting portion to be fitted to the second fitting portion on the other side thereof.

5. The energy storage device according to claim 1, further comprising:
    a tightening member that connects the current collector and the electrode terminal and inserted into the cover member.

6. The energy storage device according to claim 5, wherein the insulating member further includes an insertion hole, into which the tightening member is inserted.

7. The energy storage device according to claim 2, wherein the cover member is provided with a second recessed portion that is recessed toward the electrode assembly on a side opposite to the projecting portion with respect to the cover member, and the cover member further includes a connecting terminal partly disposed at the recessed portion in a fitted state.

8. The energy storage device according to any one of claims 1, wherein the first fitting portion is formed in a polygon.

9. An energy storage device comprising:
an electrode assembly;
a container that contains the electrode assembly therein;
a metallic cover member that closes an opening formed at the container and includes a first fitting portion comprising a projecting portion projecting toward the electrode assembly, the projecting portion projecting from a surface of the metallic cover member and being integrally formed with the metallic cover member;
a current collector that is housed inside the container and has a second fitting portion fitted to the projecting portion;
a first insulating member interposed between the cover member and the current collector;
an electrode terminal arranged on a side opposite to the current collector with respect to the cover member;
a connecting terminal that is arranged on the side opposite to the current collector with respect to the cover member and is electrically connected to the electrode terminal; and
a second insulating member interposed between the cover member and the electrode terminal;
the cover member having a recessed portion recessed toward the electrode assembly on a side opposite to the projecting portion with respect to the cover member,
the second insulating member having a connecting terminal receiving recess that is recessed toward the electrode assembly at a position corresponding to the recessed portion, and
at least a part of the connecting terminal being fitted to the connecting terminal receiving recess.

10. The energy storage device according to claim 9, wherein the first insulating member has an insulating projecting portion projecting toward the electrode assembly at a position corresponding to the projecting portion and a projecting portion receiving recess recessed toward the electrode assembly on a side opposite to the insulating projecting portion,
the projecting portion being fitted to the projecting portion receiving recess.

11. The energy storage device according to claim 10, wherein the insulating projecting portion is fitted to the second fitting portion.

12. The energy storage device according to claim 10, wherein the current collector is provided with a top plate to be laminated on the first insulating member, and
the second fitting portion has a hole portion that is formed at the top plate and is fitted to the insulating projecting portion.

13. The energy storage device according to claim 10, wherein the current collector is provided with a top plate to be laminated on the first insulating member, and
the second fitting portion has a recess portion that is formed at the top plate and is fitted to the insulating projecting portion.

14. The energy storage device according to claim 10, wherein the current collector is provided with a top plate to be laminated on the first insulating member,
the first insulating member having a base to be laminated on the top plate and a wall disposed around the base.

15. The energy storage device according to claim 14, wherein the insulating projecting portion projects toward the electrode assembly beyond the tip of the wall.

16. The energy storage device according to claim 14, wherein the insulating projecting portion projects toward the electrode assembly beyond the base.

17. An energy storage device comprising:
an electrode assembly;
a container that contains the electrode assembly therein;
a metallic cover member that closes an opening formed at the container and includes a first fitting portion having a projecting portion projecting toward the electrode assembly, the projecting portion having a non-circular perimeter shape and projecting from a surface of the metallic cover member and being integrally formed with the metallic cover member;
a current collector that has a second fitting portion to be fitted to the projecting portion, the second fitting portion having a perimeter shape corresponding to that of the projecting portion; and
an electrode terminal arranged on a side opposite to the current collector with respect to the cover member.

18. The energy storage device according to claim 17, further comprising:
an insulating member interposed between the cover member and the current collector,
wherein the insulating member includes a first surface opposed to the cover member and a second surface opposed to the current collector, the first surface being formed with a recess to be fitted to the projecting portion, the second surface being formed with a projection at a position corresponding to the recess, and
the second fitting portion is fitted to the projecting portion of the cover member via the projection of the insulating member.

19. The energy storage device according to claim 1, wherein when viewed in a direction perpendicular to the cover member, the projecting portion has a non-circular perimeter shape.

20. The energy storage device according to claim 1, wherein when viewed in a direction perpendicular to the cover member, the projecting portion has a polygonal perimeter shape.

21. The energy storage device according to claim 1, wherein a shape of a perimeter of the second fitting portion corresponds to a shape of a perimeter of the projecting portion.

22. The energy storage device according to claim 1, wherein the surface of the cover member comprises a bottom surface of the cover member, and the cover member includes a recessed portion formed within the projecting portion in an upper surface of the cover member.

23. The energy storage device according to claim 22, further comprising:
a connecting terminal including a planar portion formed between the cover member and the electrode terminal in the recessed portion of the cover member.

* * * * *